IMPULSE TRANSMISSION SYSTEMS

Original Filed Oct. 23, 1948

INVENTOR.
HENRI FEISSEL
BY Philip M. Bolton
ATTORNEY

United States Patent Office 2,770,777
Patented Nov. 13, 1956

2,770,777

IMPULSE TRANSMISSION SYSTEMS

Henri Feissel, Paris, France, assignor to International Standard Electric Corporation, New York, N. Y., a corporation of Delaware Original application October 23, 1948, Serial No. 56,243, now Patent No. 2,651,716, dated September 8, 1953. Divided and this application April 7, 1953, Serial No. 347,195

Claims priority, application France November 8, 1947

3 Claims. (Cl. 332—1)

The present invention relates to impulse transmission systems and more particularly to a system for translating amplitude modulated pulses into coded pulse groups. This application is a division of U. S. application Ser. No. 56,243, filed October 23, 1948, now Patent No. 2,651,716.

It is an object of the invention to provide an improved and simplified Pulse Code Modulation modulator.

The above mentioned and other features and objects of the invention will become more apparent and the invention itself, though not necessarily defined by said features and objects, will be best understood by reference to the following description of an embodiment of the invention taken in conjunction with the accompanying drawings wherein.

Figure 1:
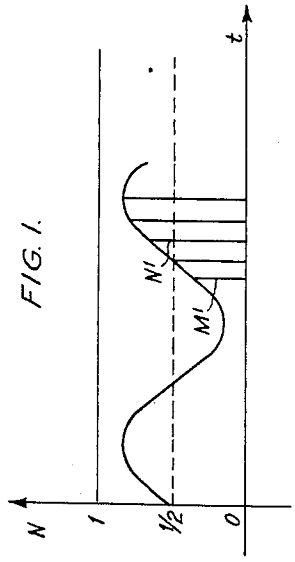
Fig. 1 and 2 are sets of curves useful for the understanding of the invention.

Referring to Fig. 1, I show a modulating signal and a sequence of impulses modulated in amplitude according to said signal. It will be assumed in order to facilitate the description that the amplitudes of these impulses vary between two reference levels, 0 and 1.

According to a feature of the invention, a certain combination of constant amplitude impulses are transmitted in time sequence for each amplitude modulated impulse. The signals transmitted are characterized by the fact that impulses are or are not transmitted at given instants. It is known that the possible number of combinations of such a code comprising a maximum of $n$ impulses is equal to $2^n$. To this effect the first impulse is made to correspond to the amplitude ½, the second to amplitude ¼, the third to amplitude ⅛ and the $n$th to amplitude $½^n$.

For any given amplitude comprised between the reference levels 0 to 1 it is thus possible to find a code combination of $n$ pulses corresponding to the said amplitude with an approximation of $½^n$.

The purpose of the coding arrangement is to translate an impulse of a given level into the corresponding nearest code combination of constant amplitude impulses, and the purpose of the decoder is to translate said code combination into single impulse whose level approximates the amplitude of the original impulse.

According to a preferred embodiment of the invention a coding arrangement will now be described.

Let I be an impulse of level $N_1$ comprised between two reference levels 0 to 1. The amplitude $N_1$ is compared to level ½; if $N_1$ is greater than ½ a first code impulse is transmitted and an impulse $I_2$ of level $N_2=2(N_1-½)$ is produced. If $N_1$ is less than ½ no first code impulse is transmitted and an impulse $I_2$ of level $N_2=2N_1$ is transmitted to the following stage. In either case the impulse $N_2$ transmitted to the next stage is comprised between 0 and 1.

The impulse of amplitude $N_2$ is then compared to level

½. If $N_2$ is greater than ½ a second code impulse is transmitted and an impulse $I_3$ of level $N_3=2(N_2-½)$, is produced. If $N_2$ is less than ½ no second code impulse is transmitted and an impulse $I_3$ of amplitude $N_3=2N_2$ is transmitted to the next stage. In both cases $N_3$ is comprised between 0 and 1. This process is repeated $n$ times, at which time the desired degree of approximation is attained.

Figure 3:
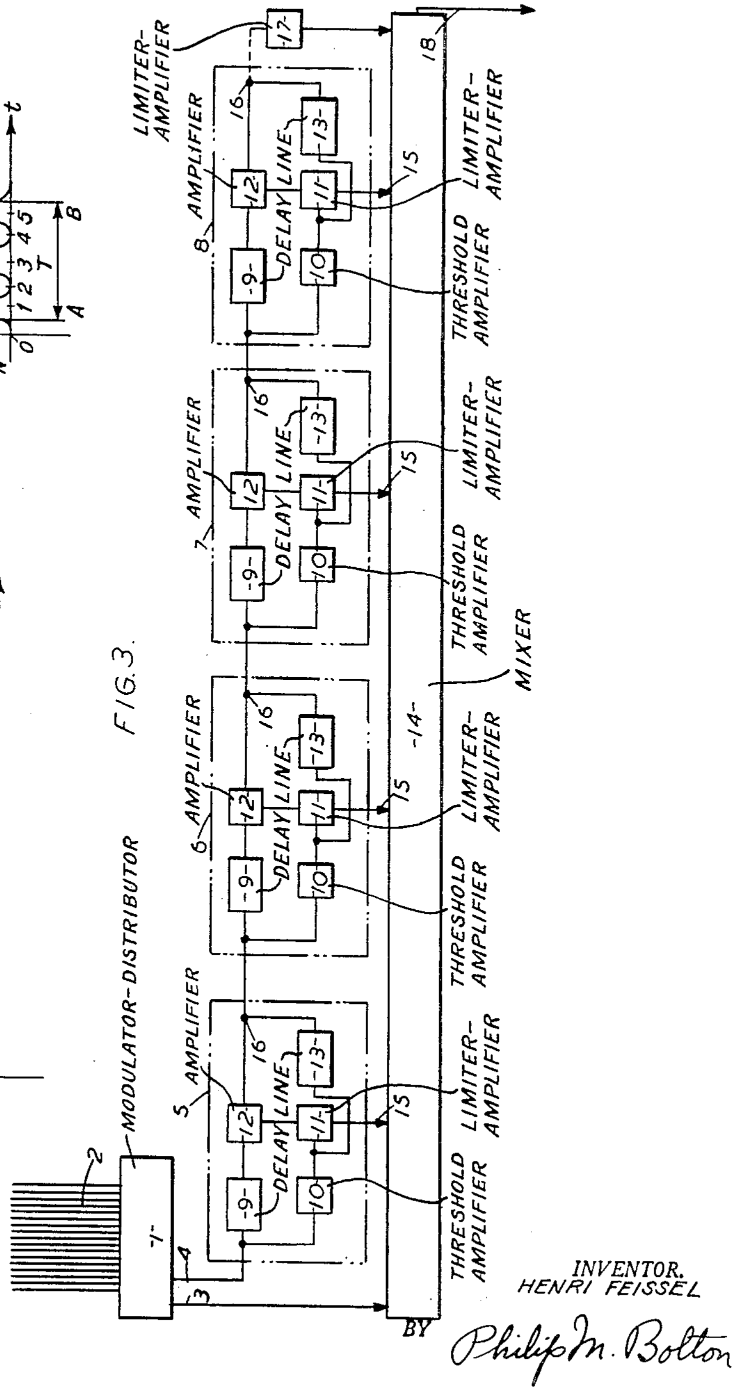
Fig. 3 is a block diagram of a coding arrangement incorporating features of the invention.

The operation of the coding arrangement will be better understood from the following description of the embodiment shown in Fig. 3, which represents a coding arrangement for a 5 unit code.

This coding arrangement comprises a modulator-distributor 1 to which are connected a number of transmission channels 2, for example voice frequency telephone channels. The modulator-distributor produces on line 3 reference impulses which are used for synchronization and on line 4 amplitude modulated impulses which are directed respectively to devices 5, 6, 7, 8 and 17 which are provided for translating amplitude modulated impulses into coded pulse groups.

Each of the devices 5, 6, 7 and 8 comprises a delay line 9 for delaying the impulses by a length of time equal to the time interval separating two successive coded impulses. Each also comprises a threshold amplifier 10 with a voltage amplification equal to 2 and arranged such that it amplifies the fraction of the input impulses applied to it which exceeds the one-half level. Each of the devices 5, 6, 7 and 8 also comprises a limiter-amplifier 11 which limits the amplitude of the impulse from 10 to a constant level chosen for the coded impulses. Each also comprises an amplifier 12 with a voltage amplification equal to 2 associated with a blocking device which operates under the action of an impulse from 11. The blocking device is provided so that amplifier 12 is blocked for a duration overlapping the retarded impulse from 1. This may be obtained by a delay line or a time constant device for widening the blocking impulse applied from 11.

A delay line 13, similar to delay line 9, is provided after the threshold amplifier 10 to delay the impulses going through it by a length of time equal to the time interval which separates two successive coded impulses.

There are thus four identical arrangements, each comprising elements such as 9, 10, 11, 12 and 13 which have just been described. The last stage 17 is a limiter-amplifier which, similarly to the preceding circuit 10, comprises a threshold device which lets through or not the fifth code impulse according to whether the impulse coming from circuit 8 is greater or smaller than the one-half reference level. A mixer 14 mixes the synchronizing impulses from 3 and the coded impulses from devices 5, 6, 7, 8 and 17.

Figure 2:
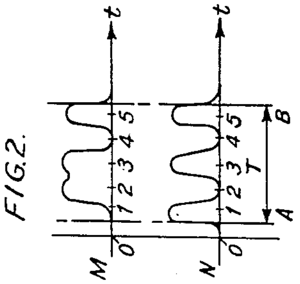

Referring again to Fig. 1, I show a set of amplitude modulated impulses and the envelope of these impulses which are comprised between the reference levels 0 and 1. As an example two impulses $M_1$ and $N_1$ of respective amplitudes 0.43 and 0.66 have been shown respectively below and above the one-half reference level. The corresponding coded impulses are shown in Fig. 2. The time interval T during which the coded impulses are transmitted is shown as AB. This time interval is divided into five equal intervals which are called elementary intervals 1, 2, 3, 4, 5 (in the case of a 5 element code). According to the code combination one impulse is or is not transmitted during each elementary interval.

When an impulse is transmitted in the third time interval, for example, we say that the third impulse is transmitted, and on the contrary that the third impulse is not transmitted if no impulse is transmitted during this time interval.

The upper part of Fig. 2 shows the coded impulses corresponding to amplitude $M_1$ (equal to 0.43) and the lower part of the figure those corresponding to amplitude $N_1$ (equal to 0.66).

The impulse $M_1$ of amplitude 0.43 which reaches circuit 5 of Fig. 3 cannot pass through amplifier 10 since its level is less than one-half. The first impulse is not transmitted and impulse $M_1$ is delayed by delay line and its amplitude doubled by amplifier 12. It reaches the following circuit 6 during the second elementary time interval with an amplitude equal to 0.86, i. e. with an amplitude greater than one-half reference level, and therefore passes through the threshold amplifier 10. A code impulse is transmitted in position 2, and an impulse with an amplitude $2(0.86-0.5)=0.72$ is transmitted to circuit 7 through delay line 13. This impulse reaches the following circuit 7 during the third elementary time interval, with an amplitude equal to $2\times0.36=0.72$. An impulse is transmitted by this circuit 7 in position 3, since the level applied to it exceeds the one-half reference level. On the contrary, the impulse transmitted to the next circuit 8 has an amplitude equal to $2(0.72-0.5)=0.44$, i. e., it is less than one-half, and no code impulse is transmitted in position 4. This impulse is amplitude doubled and applied with a level of 0.88 to the final limited device 17 which lets an impulse pass into position 5 since the level exceeds the one-half reference level. It may be noted that a distinguishing feature of the coder is that the reference level remains constant on each comparison.

The code combination transmitted is that shown in the upper part of Fig. 2. It is easily seen that in the case of impulse $N_1$ of Fig. 1, which has an amplitude of 0.66, coded impulses are transmitted in positions 1, 3 and 5 as shown on the bottom part of Fig. 2.

The duration of the coded impulses depends upon the operating conditions of the transmitter. They may be very narrow or broad enough for two successive impulses to be adjacent.

While I have described a particular embodiment of my invention for the purpose of illustration, it should be understood that various modifications and adaptations thereof may be made within the spirit of the invention as set forth in the appended claims.

What I claim is:

1. An electrical translator for converting amplitude modulated pulses to corresponding binary pulse code groups comprising a cascade of circuits each having an output equal to $2(V_i-V_r)$ for $V_i$ greater than $V_r$ and equal to $2V_i$ for $V_i$ less than $V_r$ where $V_i$ is the input voltage pulse and where $V_r$ is given reference voltage, means to apply said amplitude modulated pulses to the first circuit of said cascade, and means to produce at each circuit of said cascade a corresponding member of said pulse code group only when $V_i$ is greater than $V_r$.

2. An electrical translator according to claim 1 wherein means are provided for delaying the output voltage pulse from each circuit of said cascade prior to applying it to the input of the succeeding circuit of said cascade.

3. An electrical translator according to claim 1 wherein each circuit of said cascade comprises means to apply the input voltage pulse to a first path and to a second path, in said first path a delay device and an amplifier having a gain of two connected in cascade, in said second path a delay device and a threshold amplifier having a gain of two for the portion of the input voltage pulse $V_i$ which exceeds $V_r$ connected in cascade, means for combining the output voltages of said two paths, and means for blocking said first-named amplifier only when $V_i$ exceeds $V_r$.

References Cited in the file of this patent

UNITED STATES PATENTS

| | | |
|---|---|---|
| 2,569,927 | Gloess et al. | Oct. 2, 1951 |
| 2,660,618 | Aigrain | Nov. 24, 1953 |